United States Patent
Chang et al.

(10) Patent No.: US 10,253,609 B2
(45) Date of Patent: Apr. 9, 2019

(54) PERMEABILITY OF SUBTERRANEAN RESERVOIRS USING ACID DIVERSION

(71) Applicant: Ecolab USA Inc., Eagan, MN (US)

(72) Inventors: Kin-Tai Chang, Sugar Land, TX (US); Eldon Dwyann Dalrymple, Pearland, TX (US)

(73) Assignee: Ecolab USA Inc., St. Paul, MN (US)

( * ) Notice: Subject to any disclaimer, the term of this patent is extended or adjusted under 35 U.S.C. 154(b) by 1054 days.

(21) Appl. No.: 14/264,664

(22) Filed: Apr. 29, 2014

(65) Prior Publication Data
US 2015/0307769 A1 Oct. 29, 2015

(51) Int. Cl.
*E21B 43/28* (2006.01)
*C09K 8/588* (2006.01)
*C09K 8/72* (2006.01)

(52) U.S. Cl.
CPC ............ *E21B 43/283* (2013.01); *C09K 8/588* (2013.01); *C09K 8/72* (2013.01); *C09K 8/725* (2013.01); *C09K 2208/24* (2013.01); *C09K 2208/26* (2013.01); *C09K 2208/28* (2013.01)

(58) Field of Classification Search
None
See application file for complete search history.

(56) References Cited

U.S. PATENT DOCUMENTS

| | | |
|---|---|---|
| 4,210,205 A | 7/1980 | Allen et al. |
| 4,497,596 A | 2/1985 | Borchardt et al. |
| 4,563,292 A | 1/1986 | Borchardt |
| 4,693,639 A | 9/1987 | Hollenbeak et al. |
| 5,464,924 A | 11/1995 | Silvis et al. |
| 6,569,983 B1 * | 5/2003 | Treybig ................. C08G 59/50 166/270 |
| 7,417,011 B2 | 8/2008 | Treybig et al. |
| 7,504,438 B1 | 3/2009 | Treybig et al. |
| 7,678,872 B2 | 3/2010 | Glass et al. |
| 7,721,803 B2 | 5/2010 | Huang et al. |
| 7,893,136 B2 | 2/2011 | Glass et al. |
| 8,020,617 B2 | 9/2011 | Shenoy et al. |

(Continued)

FOREIGN PATENT DOCUMENTS

EP 0 475 503 A1 3/1992

OTHER PUBLICATIONS

Gomaa, A. M. M., "Acid Diversion in Carbonate Reservoirs Using Polymer-Based In-Situ Gelled Acids," Thesis presented to the Office of Graduate Studies of Texas A&M University, May 2011, 255 pages.

*Primary Examiner* — Anuradha Ahuja
(74) *Attorney, Agent, or Firm* — Stinson Leonard Street LLP (57) ABSTRACT

Methods for acid diversion in a hydrocarbon-containing subterranean formation are disclosed. The methods include injecting an acid diversion agent comprising a water-soluble or dispersible branched polyhydroxyetheramine and injecting an acidic solution into a well which is in contact with the hydrocarbon-containing subterranean formation. Preferably, the acid solution is diverted toward a zone of the formation that has a lower permeability to fluid than an adjacent zone. This process improves the permeability of the hydrocarbon-containing subterranean formation to hydrocarbons, while decreasing the permeability of the formation to water or brine.

17 Claims, 2 Drawing Sheets

(56) References Cited

U.S. PATENT DOCUMENTS

| | | | | |
|---|---|---|---|---|
| 2005/0000694 A1* | 1/2005 | Dalrymple | ............... | C09K 8/68 166/307 |
| 2005/0065036 A1* | 3/2005 | Treybig | ............... | C08G 59/184 507/111 |
| 2005/0194140 A1* | 9/2005 | Dalrymple | ........... | C09K 8/5083 166/279 |
| 2006/0189488 A1* | 8/2006 | Treybig | ................ | C08G 59/50 507/244 |
| 2008/0085844 A1* | 4/2008 | Treybig | ............... | C08G 59/184 507/219 |
| 2014/0116691 A1* | 5/2014 | Dalrymple | ........... | C09K 8/5751 166/276 |

* cited by examiner

PERMEABILITY OF SUBTERRANEAN RESERVOIRS USING ACID DIVERSION

FIELD OF THE INVENTION

The invention is directed to a method for increasing recovery of crude oil from a subterranean hydrocarbon-containing formation by injecting an acid and an acid diversion agent into a well which is in contact with the subterranean hydrocarbon-containing formation. The method improves permeability in the wellbore area by creating large flow channels called wormholes. In particular, the invention is directed to injecting an acid and a water-soluble alkylene oxide branched polyhydroxyetheramine composition into a well to divert the acid into regions of the formation that are less permeable to the acid.

BACKGROUND OF THE INVENTION

The present invention relates to the technical field of increasing recovery of crude oil from a subterranean hydrocarbon-containing formation using a fluid, in particular, an acid fluid. These methods are useful in the petroleum and associated industries. When crude oil production declines, there are a number of causes for the decline in production. Two reasons for a decline in oil production are (1) a reduction in the permeability of the oil "reservoir" or (2) the invasion of this reservoir by the water contained in a lower layer.

A reduction in permeability is typically due to the entrainment of fines, by the flow of the oil, towards the production well. Around this well, these particles accumulate and gradually plug the natural pores in the rock. The oil can then no longer flow out at an efficient rate through this well. These particles can be of various origins (e.g., type of rock, damage to the formation, progressive deterioration of the rock, etc.).

In order to remove these particles and improve the mobility of the oil in the formation, an acidic fluid can be injected into the well where some of the particles and some of the rock in the formation are partially soluble in this acidic fluid. Thus, this well stimulation method can cause these particles and rock to partially dissolve, and make the rock of the formation more porous thereby increasing the mobility of the oil in the formation and increasing well production.

Further, the invasion by water of the oil producing zone is due to the difference in viscosity between oil and water. Since water is less viscous than oil, it is more mobile than the oil, and once the rocks in the formation become more porous, the water of the aqueous solution follows the path of least resistance. In order to provide a greater area where the acidic solution improves the permeability of the rock in the formation, various agents are included in the acidic fluid to divert the acidic fluid into neighboring areas of the formation to maximize contact of the acid with the rock. A continuing need exists for alternative agents for acid diversion in these situations that are easier to apply and more environmentally friendly.

BRIEF SUMMARY OF THE INVENTION

One aspect of the invention includes a method for increasing recovery of crude oil from a subterranean hydrocarbon-containing formation. The method comprises injecting a composition comprising a water-soluble or dispersible branched polyhydroxyetheramine into a well which is in contact with the subterranean hydrocarbon-containing formation at a concentration of from about 500 ppm to about 50,000 ppm based on the total amount of fluid injected into the well; and injecting an acid solution into the well at a concentration of from about 5 wt. % to about 28 wt. % acid based on the total amount of fluid injected into the well.

The method results in the acid solution being diverted toward a zone of the porous subterranean reservoir that has a lower permeability to fluid than an adjacent zone.

The water soluble or dispersible polyhydroxyetheramine can be a reaction product of a diglycidyl ether of bisphenol A (a diepoxy compound), an ethanol amine, diethanol amine, and a monofunctionalized polyoxyalkyleneamine (an example of which is Jeffamine™).

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

This invention is directed to a solids free acid diversion agent that does not damage the wellbore, formation, and equipment. During placement in the acid stage of the well stimulation process, the acid diversion agent is a clear, low viscosity liquid that can be easily batch mixed or added at any point in the field during the well stimulating process.

As the acid reacts with the formation rock in the reservoir, the pH increases, and the cloud point of the solution is dramatically reduced. The lower solubility at the higher pH suggests that the polymer can then coat the surface of the pore. This would stop the subsequent acid flow and would divert subsequent acid flow into areas that have not yet contacted acid. The colloidal particles formed as a result of this change in pH have been found to hinder water flow but not interfere with hydrocarbon flow (i.e., oil and gas).

The acid diversion agent can comprise a water soluble or dispersible polyhydroxyetheramine. While not being bound to any theory, it is believed that the water soluble or dispersible polyhydroxyetheramine has a relationship between the cloud point and pH where the cloud point reaches a minimum value at a pH of between about 3 and 4. This pH to cloud point relationship is advantageous to providing a self-regulated acid diversion agent that provides advantageous acid diversion.

Thus, the acid diversion agent of the invention advantageously provides a well stimulation method that can improve productivity of oil and gas wells by increasing the permeability of the rock formation in adjacent areas by diverting the acidic fluid into areas of lower permeability. This diversion of the acidic fluid allows the acidic solution to contact a greater area of the subterranean hydrocarbon-containing formation, which increases the amount of the rock that reacts with the acid and is dissolved. This increased amount of area of reaction with the rock also increases the permeability of the formation to the crude oil and increases the production of the crude oil from the formation.

The acid diversion agent can be a water-soluble or dispersible branched polyhydroxyetheramine composition that comprises an alkylene oxide branched polyhydroxyetheramine or a salt thereof.

The alkylene oxide branched polyhydroxyetheramine can be synthesized by reacting a diepoxide or a mixture of a diepoxide and a multi-epoxide compound with (a) an alkylene oxide functionalized amine or a mixture of an alkylene oxide functionalized amine and an amine; (b) an amine having two reactive hydrogen atoms; and (c) optionally reacting the resulting polyhydroxyetheramine with an acid or alkylating agent to form the salt.

The diepoxide used in the synthesis can be a diglycidyl ester of a diacid, a diglycidyl ether of a diol, a diglycidyl ether of a polyol, a diglycidyl ether of a polyhydric phenol, an epoxidized olefin, or a combination thereof.

The alkylene oxide functionalized amine can be one of the following amines of formula (a)-(d):

The group, $R_1$, can independently be $(-CH_2-CH_2-O-)_p$, $(-CH_2-CH(CH_3)-O-)_q$, or a mixture thereof. The group, $R_3$, can be $C_2$-$C_{20}$ alkylene, optionally substituted with hydroxy, alkoxy, halo, cyano, aryloxy, alkylcarbonyl or arylcarbonyl. The substituent, $R_4$, can be alkoxy and $R_5$ can be hydrogen or methyl. The substituent, $Z_1$, can be independently selected at each occurrence from hydrogen, $C_1$-$C_7$ alkyl and acyl, and n, p, q, and r can be independently selected from integers of 1 to about 45.

The amines can be hexylamine, heptylamine, octylamine, nonylamine, decylamine, undecylamine, dodecylamine, tridecylamine, tetradecylamine, hexadecylamine, octadecylamine, 13-docosen-1-amine (erucylamine), or an aryl amine.

The amine having two reactive hydrogen atoms can be an amine of the following formulae (e)-(g):

The group, R, can be $C_2$-$C_{30}$ alkylene or aryl, optionally substituted with one or more hydroxy or hydroxyalkyl groups. The group, $R_2$, can be $C_2$-$C_{10}$ alkylene, optionally substituted with alkylamido, hydroxy, alkoxy, cyano, dialkylamine, aryloxy, alkylcarbonyl or arylcarbonyl. The group, $R_3$, can be $C_2$-$C_{20}$ alkylene optionally substituted with alkylamido, hydroxy, alkoxy, halo, cyano, aryloxy, alkylcarbonyl or arylcarbonyl, and Z can be hydrogen, alkylamido, hydroxy, dialkylamine, alkoxy, aryloxy, cyano, alkylcarbonyl, or arylcarbonyl.

For example, R can be methylene or ethylene, $R_2$ can be ethylene, $R_3$ can be $C_2$-$C_{20}$ alkylene optionally substituted with alkylamido, dialkylamino, hydroxy or alkoxy, and Z can be alkylamido, dialkylamino, hydroxy or alkoxy.

The amine having two reactive hydrogen atoms can be methylamine, ethylamine, propylamine, butylamine, sec-butylamine, isobutylamine, 3,3-dimethylbutylamine, hexylamine, benzylamine, 2-amino-1-butanol, 4-amino-1-butanol, 2-amino-2-methyl-1-propanol, 6-amino-1-hexanol, ethanolamine, propanolamine, tris(hydroxymethyl)aminomethane, 1-amino-1-deoxy-D-sorbitol, 3-amino-1,2-propanediol, 2-amino-2-methyl-1,3-propanediol, 2-amino-2-ethyl-1,3-propanediol, 3-(dimethylamino)propylamine, N,N-dimethylethylenediamine, N,N-diethylethylenediamine, 1-(2-aminoethyl)piperidine, 4-(2-aminoethyl)morpholine, 2-(2-aminoethyl)-1-methylpyrrolidine, 1-(2-aminoethyl)pyrrolidine, 2-(2-aminoethyl)pyridine, 2-(2-aminoethoxy)ethanol, 2-(2-aminoethylamino)ethanol, piperazine, 2-methylpiperazine, 2,6-dimethylpiperazine, 2-(methylamido)piperazine, N,N'-bis(2-hydroxyethyl)ethylenediamine, N,N'-dimethylethylenediamine, N,N'-dimethyl-1,4-phenylenediamine, and N,N'-dimethyl-1,6-hexanediamine.

The diglycidyl esters of diacids, diglycidyl ethers of diols, diglycidyl ethers of polyols, and epoxidized olefins can be diglycidyl ether of dimer acid, bis(2,3-epoxypropyl)ether, diglycidyl ether of 1,4-butanediol, diglycidyl ether of neopentyl glycol, diglycidyl ether of ethylene glycol, glycerol diglycidyl ether, digylcidyl ether of sorbitol, diglycidyl ether of trimethylol propane, diglycidyl ether of polyethyleneglycols, diglycidyl ether of polypropylene glycols, diglycidyl ether of glycols from the reaction of ethylene oxide with propylene oxide, diglycidyl ether of cyclohexane dimethanol, 1,2,3,4-diepoxybutane, 1,2,7,8-diepoxyoctane, 1,2,9,10-diepoxydecane, 1,2,5,6-diepoxycyclooctane, and a diglycidyl ether of glycerol.

The diglycidyl ether of a polyhydric phenol can be a diglycidyl ether of resorcinol, catechol, hydroquinone, bisphenol A, bisphenol F, bisphenol E, bisphenol K, 4,4'-dihydroxydiphenyl sulfide, bisphenol S, 4,4'-thiodiphenol, 2,6-dihydroxynaphthalene, 1,4'-dihydroxynapthalene, 9,9-bis(4-hydroxyphenyl)fluorine, dihydroxy dinitrofluorenylidene, diphenylene, 2,2-bis(4-hydroxyphenyl)-acetamide, 2,2-bis(4-hydroxyphenyl)ethanol, 2,2-bis(4-hydroxyphenyl)-N-methylacetamide, 2,2-bis(4-hydroxyphenyl)-N,N-dimethylacetamide, 3,5-dihydroxyphenyl-acetamide, 2,4-dihydroxyphenyl-N-(hydroxyethyl)-acetamide, 2,2-bistris-hydroxyphenyl methane, 2,6,2',6'-tetrabromo-p,p'-bisphenol A, 2,6,2',6'-tetramethyl-3,5,3'-tribromo-p,p'-biphenol, 2,6,2',6'-tetramethyl-3,5,3'5'-tetrabromo-p,p'-biphenol, tetramethylbiphenol, 4,4'-dihydroxydiphenylethylmethane, 3,3'-dihydroxydiphenyldiethylmethane, 3,4'-dihydroxydiphenylmethylpropylmethane, 4,4'-dihydroxydiphenyloxide, 4,4'-dihydroxydiphenylcyanomethane, 4,4'-sulfonyldiphenol, 4,4'-oxydiphenol, and 4,4'-dihydroxybenzophenone.

The diepoxide compound can be a diglycidyl ether of resorcinol, a diglycidyl ether of catechol, a diglycidyl ether of hydroquinone, a diglycidyl ether of bisphenol A, a diglycidyl ether of bisphenol F, a diglycidyl ether of bisphenol E, a diglycidyl ether of bisphenol K, a diglycidyl ether of 1,4'-dihydroxynapthalene, a diglycidyl ether of 2,2-bis(4-hydroxyphenyl)ethanol, a diglycidyl ether of 2,2-bistris-hydroxyphenyl methane, a diglycidyl ether of 2,6,2', 6'-tetrabromo-p,p'-bisphenol A, a diglycidyl ether of 4,4'-dihydroxydiphenylethylmethane, a diglycidyl ether of 3,3'-dihydroxydiphenyldiethylmethane, or a combination thereof.

The water-soluble alkylene oxide branched polyhydroxyetheramine comprises a secondary amine, a tertiary amine, a ditertiary amine, or a combination thereof as end groups.

The water-soluble alkylene oxide branched polyhydroxyetheramine comprising a secondary amine, a tertiary amine, or a ditertiary amine as end groups can be prepared by reacting a diepoxide with (a) an alkylene oxide functionalized amine or a mixture of an alkylene oxide functionalized amine and a fatty amine; (b) an amine having two reactive hydrogen atoms to form the water-soluble alkylene oxide branched polyhydroxyetheramine; and (c) reacting the water-soluble alkylene oxide branched polyhydroxyetheramine with an amine having one or two reactive hydrogen atoms.

An alternate method for preparing the water-soluble alkylene oxide branched polyhydroxyetheramine comprising a secondary amine, a tertiary amine, or a ditertiary amine as an end group includes the steps of reacting a diepoxide with (a) an alkylene oxide functionalized amine or a mixture of an alkylene oxide functionalized amine and a fatty amine; (b) an amine having two reactive hydrogen atoms; and (c) an amine having three or more reactive hydrogen atoms to form the water-soluble alkylene oxide branched polyhydroxyetheramine; and (d) reacting the water-soluble alkylene oxide branched polyhydroxyetheramine with an amine having one or two reactive hydrogen atoms.

The alkylene oxide branched polyhydroxyetheramine can be prepared by reacting a mixture of diepoxide and an aliphatic or aromatic triepoxide with (a) an alkylene oxide functionalized amine or a mixture of an alkylene oxide functionalized amine and a fatty amine; and (b) an amine having two reactive hydrogen atoms to impart cross linking. The method can further include the step of reacting the alkylene oxide branched polyhydroxyetheramine with an acid or alkylating agent.

The water-soluble or dispersible branched polyhydroxyetheramine can be prepared by (a) reacting an amine having two reactive hydrogen atoms with a diepoxide to form a polyhydroxyetheramine; and then (b) reacting the polyhydroxyetheramine with an N-alkylating agent to form the water-soluble branched polyhydroxyetheramine. The method can further comprise the step of reacting the polyhydroxyetheramine with an amine having one or two reactive hydrogen atoms. The method can also further comprise the step of adding an aliphatic triepoxide simultaneously with the diepoxide.

The amine having two reactive hydrogen atoms can be an amine of formulae (a)-(g):

(a)

(b)

(c)

(d)

(e)

(f)

(g)

wherein R can be $C_2$-$C_{10}$ alkylene, optionally substituted with one or more hydroxy or hydroxyalkyl groups. The group, $R_1$, can be independently selected at each occurrence from a group of formula $(—CH_2—CH_2—O—)_p$ and a group of formula $R_2$ can be $C_2$-$C_{10}$ alkylene, optionally substituted with alkylamido, hydroxy, alkoxy, halo, cyano, dialkylamine, aryloxy, alkylcarbonyl, or arylcarbonyl. The group, $R_3$, can be $C_2$-$C_{20}$ alkylene optionally substituted with alkylamido, hydroxy, alkoxy, halo, cyano, aryloxy, alkylcarbonyl, or arylcarbonyl. The substituent, $R_4$, can be alkoxy and $R_5$ can be hydrogen or methyl. The substituent, Z, can be hydrogen, alkylamido, hydroxy, dialkylamine, alkoxy, halo, aryloxy, cyano, alkylcarbonyl, or arylcarbonyl and $Z_1$ can be hydrogen, $C_1$-$C_7$ alkyl or acyl, and n, p, q, and r can be independently selected from integers of 1 to about 45.

For example, R can be methylene or ethylene, $R_2$ can be ethylene, $R_3$ can be $C_2$-$C_{20}$ alkylene optionally substituted with alkylamido, dialkylamino, hydroxyl, or alkoxy, and Z can be alkylamido, dialkylamino, hydroxy or alkoxy.

The amine can be methylamine, ethylamine, propylamine, butylamine, sec-butylamine, isobutylamine, 3,3-dimethylbutylamine, hexylamine, benzylamine, 2-amino-1-butanol, 4-amino-1-butanol, 2-amino-2-methyl-1-propanol, 6-amino-1-hexanol, ethanolamine, propanolamine, tris(hydroxymethyl)aminomethane, 1-amino-1-deoxy-D-sorbitol, 3-amino-1,2-propanediol, 2-amino-2-methyl-1,3-propanediol, 2-amino-2-ethyl-1,3-propanediol, 3-(dimethylamino)propylamine, N,N-dimethylethylenediamine, N,N-diethylethylenediamine, 1-(2-aminoethyl)piperidine, 4-(2-aminoethyl)morpholine, 2-(2-aminoethyl)-1-methylpyrrolidine, 1-(2-aminoethyl)pyrrolidine, 2-(2-aminoethyl)pyridine, 2-(2-aminoethoxy)ethanol, 2-(2-aminoethylamino)ethanol, piperazine, 2-methylpiperazine, 2,6-dimethylpiprazine, 2-(methylamido)piperazine, N,N'- bis(2-hydroxyethyl)ethylenediamine, N,N'-dimethylethylenediamine, N,N'-dimethyl-1,4-phenylenediamine, or N,N'-dimethyl-1,6-hexanediamine.

The diepoxide can be a diglycidyl ester of a diacid, a diglycidyl ether of a diol, an epoxidized olefin, a diglycidyl ether of dimer acid, bis(2,3-epoxypropyl)ether, diglycidyl ether of 1,4-butanediol, diglycidyl ether of neopentyl glycol, diglycidyl ether of ethylene glycol, glycerol diglycidyl ether, diglycidyl ether of polyethyleneglycols, diglycidyl ether of polypropylene glycols, diglycidyl ether of a glycol from the reaction of ethylene oxide with propylene oxide, diglycidyl ether of cyclohexane dimethanol, 1,2,3,4-diepoxybutane, 1,2,7,8-diepoxyoctane, 1,2,9,10-diepoxydecane, or 1,2,5,6-diepoxycyclooctane.

The N-alkylating agent can be a halogen-containing polyalkoxide, an alkyl halide, or an alcohol sulfate.

The water-soluble branched polyhydroxyetheramine can be (1) a diethanolamine capped ethanolamine/diglycidyl ether of neopentyl glycol copolymer grafted with epichlorohydrin terminated polyethyleneglycol methyl ether; (2) an N,N,N'-trimethyl-1,3-propanediamine capped ethanolamine/3-(dimethylamino)propylamine/diglycidyl ether of neopentyl glycol terpolymer grafted with epichlorohydrin terminated polyethyleneglycol methyl ether polymer; (3) a diethanolamine capped 3-(dimethylamino)propylamine/ethanolamine/poly(ethylene glycol)diglycidyl ether terpolmer grafted with epichlorohydrin terminated polyethyleneglycol methyl ether; or (4) a diethanolamine capped 3-(dimethylamino)propylamine/ethanolamine/ethylene glycol diglycidyl ether terpolymer grafted with epichlorohydrin terminated polyethyleneglycol methyl ether. These polyhydroxyetheramines are disclosed in U.S. Pat. No. 6,569,983, incorporated herein for the purposes of the description of these polymers and methods of making the same.

The water soluble or dispersible polyhydroxyetheramine composition can be the reaction product of a diglycidyl ether of bisphenol A (a diepoxy compound), an ethanol amine, diethanol amine, and Jeffamine™, which is a monofunctionalized polyoxyalkyleneamine. Such water soluble or dispersible polyhydroxyetheramine compositions and processes for preparing such compositions are disclosed in U.S. Pat. Nos. 7,893,136 and 7,678,872, the contents of which are incorporated herein by reference.

Generally, a water soluble or dispersible polyhydroxyetheramine composition can be made as follows. Into a glass resin kettle is added about 2 equivalents of Dow D.E.R. epoxy resin, about 0.15 moles of a polyetheramine having an average molecular weight of about 2,000 Daltons, about 0.9 moles ethanolamine, and about 0.075 moles diethanolamine. The reaction mixture is stirred under nitrogen purge and heated to a point where the reaction is self-heating. Cooling is applied to the resin kettle to maintain the reaction temperature below 80° C. After the exotherm subsides, the reaction mixture is heated at 80° C. for 1 hour to yield a viscous resin that is cloudy due to entrained gas bubbles. D.I. water (25 mL) is added drop wise to the stirred reaction mixture at a rate 10 mL/minute to reduce viscosity. The reaction is allowed to continue at 80° C. for about 1.5 hours, and then additional D.I. water is added at a rate of 10 mL/min. After stirring an additional 10 minutes, the temperature is reduced to 50° C., and the reaction is diluted with D.I. water. The resulting mixture is stirred at 50° C. for 2 hours to give a colorless translucent solution comprising 20% solids by weight.

Specifically, the preferred water soluble or dispersible polyhydroxyetheramine composition can be made as follows. Into a 0.5 L glass resin kettle was added Dow D.E.R. 322 epoxy resin (72.210 g, EEW=172.4), Jeffamine™ M-2070 (65.356 g), ethanolamine (10.884 g), and diethanolamine (1.579 g). The reaction mixture was stirred under nitrogen purge and heated to 50° C., at which point, the reaction began self-heating. Cooling was applied to the resin kettle to maintain the reaction temperature below 80° C. After the exotherm subsided, the reaction mixture was heated at 80° C. for 1 hour to yield a viscous resin that was cloudy due to entrained gas bubbles. D.I. water (25 mL) was added drop wise to the stirred reaction mixture at a rate 10 mL/minute to reduce viscosity. The reaction was allowed to continue at 80° C. for 1.5 hours, and then an additional 25 mL of D.I. water was added at a rate of 10 mL/min. After stirring an additional 10 minutes, the temperature was reduced to 50° C., and the reaction was diluted with 550 mL of D.I. water. The resulting mixture was stirred at 50° C. for 2 hours to give a colorless translucent solution comprising 20% solids by weight. A small portion of the aqueous resin solution was heated in an oven for 2 hours at 120° C. to yield a dried product with an inherent viscosity of 0.21 dL/g (N,N-dimethylformamide, 30.0° C., 0.5 g/dL). The VX 11274 can be made according to this process.

The acid diversion agent can be synthesized using Jeffamine™, a monofunctionalized polyoxyalkyleneamine. Representative examples of Jeffamine™ that can be used to synthesize the water soluble or dispersible polyhydroxyetheramine composition are M-1000 and M-2070.

The acid diversion agent can be diluted in a brine solution to form a brine mixture and the brine mixture can then be pumped into the porous subterranean formation at a matrix rate. The term matrix rate refers to a process of injecting a fluid into a subterranean formation at pressures below the fracturing (parting) pressure of the formation rock.

The brine used in the injection fluid can comprise from about 2 wt % to about 7 wt % KCl. Preferably, the brine can comprise about 6 wt. % NaCl.

The acid diversion method can also include the steps of (i) mixing the acid diversion agent with a hydraulic fracturing fluid to form a fracturing mixture and (ii) introducing the mixture into the porous subterranean formation during fracture stimulation, wherein the acid solution is diverted toward a zone of the porous subterranean formation that has a lower permeability to fluid than an adjacent zone.

The acid diversion agent can be injected into the subterranean formation at an effective amount, the effective amount of the acid diversion agent being a concentration of from about 500 ppm to about 50,000 ppm based on the total amount of fluid injected into the formation. The effective amount of the acid diversion agent can be from about 1000 ppm to about 40,000 ppm; from about 1000 ppm to about 30,000 ppm; from about 1500 ppm to about 25,000 ppm; and from about 2000 ppm to about 25,000 ppm.

The effective amount of the acid diversion agent can be from about 2000 ppm to about 20,000 ppm based on the total amount of fluid injected into the formation.

The acid for addition to the aqueous solution can be a strong acid, a weak acid, or a combination thereof.

When the acid is a strong acid, the strong acid can be sulfuric acid, hydrochloric acid, hydrobromic acid, hydroiodic acid, or a combination thereof.

When the rock in the subterranean formation comprises a carbonate mineral, the preferred acid is hydrochloric acid.

When the acid is a weak acid, the weak acid can be phosphoric acid, phosphonic acid, hydrofluoric acid, or a combination thereof.

When the rock in the subterranean formation comprises sandstone, the preferred acid is a combination of hydrochloric acid and hydrofluoric acid.

The concentration of the acid can be injected into the formation in an effective amount, the effective amount can be from about 5 wt. % to about 28 wt. %, from about 10 wt. % to about 20 wt. %, or about 15 wt. % based on the total amount of the fluid injected into the formation.

The injected fluid can be, for example, water, brine (salt water), hydraulic fracture stimulation fluid (i.e. fracking fluid), acidizing additives, or any other type of aqueous fluid.

The acid diversion agent can be injected into the formation during almost any stage in the life of the well, such as during drilling, completion, or stimulation. The acid diversion agents are used in well stimulations methods to help increase permeability and improve production.

When the acid diversion agent is injected with the acid into the formation, the acid solution reacts with at least about 25% more of the rock formation than when an identical acid solution without the acid diversion agent is injected into the formation.

Preferably, when the acid diversion agent is injected with the acid into the formation, the acid solution reacts with at least about 30%, 35%, 40%, 45%, 50%, 60%, 70%, 80%, 90%, 100%, 125%, 150%, 175%, 200%, 225%, 250%, 275%, 300% or more of the rock formation based on the weight of the rock formation that has reacted as compared to an identical acid solution without the acid diversion agent is injected into the formation. Further, when the acid diversion agent is injected with the acid into the formation, the acid solution reacts with from about 25% to about 500%, from about 50% to about 500%, from about 75% to about 500%, from about 100% to about 500%, from about 50% to about 200%, from about 50% to about 300%, from about 50% to about 400%, from about 25% to about 100%, from about 25% to about 75%, from about 25% to about 50%, from about 30% to about 100%, from about 30% to about 75%, from about 30% to about 50%, from about 35% to about 100%, from about 35% to about 75%, from about 35% to about 50%, from about 40% to about 100%, from about 40% to about 75%, from about 40% to about 50%, from about 45% to about 100%, from about 45% to about 75%, from about 45% to about 60%, from about 50% to about 100%, from about 50% to about 75%, from about 50% to about 60%, of the rock formation based on the weight of the rock formation that has reacted as compared to an identical acid solution without the acid diversion agent is injected into the formation.

Additional additives typically used in hydraulic fracturing or used post-primary fracturing can be injected into the well, such as a viscosifying agent, a solvent, an alkali, a flow back aid, a non-emulsifier, a friction reducer, a breaker, a cross-linking agent, a biocide, or a proppant (e.g., sand). These additives typically are less than 1% of the fracturing fluid volume.

The subterranean hydrocarbon-containing formation can comprise a sandstone reservoir or a carbonate reservoir.

The injection step of the methods of the invention can occur after hydraulic fracturing of the well.

The injection step of the methods of the invention can occur during hydraulic fracturing of the well.

Unless otherwise indicated, an alkyl group as described herein alone or as part of another group is an optionally substituted linear saturated monovalent hydrocarbon substituent containing from one to sixty carbon atoms and preferably one to thirty carbon atoms in the main chain or eight to thirty carbon atoms in the main chain, or an optionally substituted branched saturated monovalent hydrocarbon substituent containing three to sixty carbon atoms, and preferably eight to thirty carbon atoms in the main chain. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, and the like.

The terms "aryl" or "ar" as used herein alone or as part of another group (e.g., aralkyl) denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl. The term "aryl" also includes heteroaryl.

The terms "halogen" or "halo" as used herein alone or as part of another group refer to chlorine, bromine, fluorine, and iodine.

The term "-ene" as used as a suffix as part of another group denotes a bivalent substituent in which a hydrogen atom is removed from each of two terminal carbons of the group, or if the group is cyclic, from each of two different carbon atoms in the ring. For example, alkylene denotes a bivalent alkyl group such as methylene ($-CH_2-$) or ethylene ($-CH_2CH_2-$), and arylene denotes a bivalent aryl group such as o-phenylene, m-phenylene, or p-phenylene.

The term "alkoxy," as used herein alone or as part of another group, denotes an optionally substituted group having the structure —OR, wherein R is alkyl, alkenyl, or alkynyl as described herein.

Having described the invention in detail, it will be apparent that modifications and variations are possible without departing from the scope of the invention defined in the appended claims.

EXAMPLES

The following non-limiting examples are provided to further illustrate the present invention.

Example 1: Core Test

Flow studies were conducted using 15% hydrochloric acid (HCl) on 1.5" diameter×12" long Indiana limestone cores to compare treated (i.e., treated solution comprises acid and the acid diversion agent) versus untreated acid solution (i.e., untreated solution comprises the acid only). Four cores drilled adjacent to each other from a single block of quarried limestone were used. The pressure response and volume to wormhole breakthrough time were compared. Two tests were conducted for each of the treated and untreated conditions for comparison within and between the treated and untreated groups.

A Hassler style heated core holder was used for the flow tests. The core holder was equipped with a differential pressure transducer to monitor the pressure drop across the core plug. The pressure and temperature data was recorded by a data acquisition computer. The core holder was dual ported on both ends. A displacement cylinder was attached to one port with a bypass line and valves to allow the brine solution to either be pumped into the cylinder to displace acid or bypass the cylinder and enter the core holder through the second port. The opposite end of the core holder exited to a back pressure regulator set at 1500 psi to sequester carbon dioxide ($CO_2$) gas generated by the reaction of the acid with the rock. Also, a bypass line with valves was installed around the core holder to allow initial purging of fluids and to preload the port with acid prior to testing. The test temperature was set at 160 OF with a net confining pressure of 1000 psi.

The Indiana limestone core plugs drilled from a single block of quarried limestone adjacent to each other were trimmed to square the ends, dried, and weighed. Each core was vacuum saturated in API standard brine (9% NaCl+1% $CaCl_2$) and loaded into the core holder.

An initial permeability of the cores were measured by constant rate flow with API brine through the bypass line of the displacement cylinder at 0.5 mL/minute to evaluate the initial core permeability. The flow of the brine was then directed into the displacement cylinder and out through the core holder bypass to preload the acid into the port on the core holder. Excess acid was swept out via this same bypass through the brine port. The bypass valve was then closed to direct the flow of the treating solution through the core holder.

The API brine flow was started at 3 mL/minute (e.g., the rate necessary to have sufficient mass transport of acid to generate a wormhole). Once the differential pressure across the core holder was stable, the bypass line was closed and acid forced through the core without stopping flow. Acid injection was continued until the differential pressure fell to less than 1% of the initial pressure value or reached a state of cyclic pressure with no further decline. The bypass line was then opened and excess acid was flushed from the core sample and lines. The core holder was cooled, depressurized, and the core plug was removed. The plug was dried and weighed to estimate the weight loss of the core due to the acid treatment.

Figure 1:
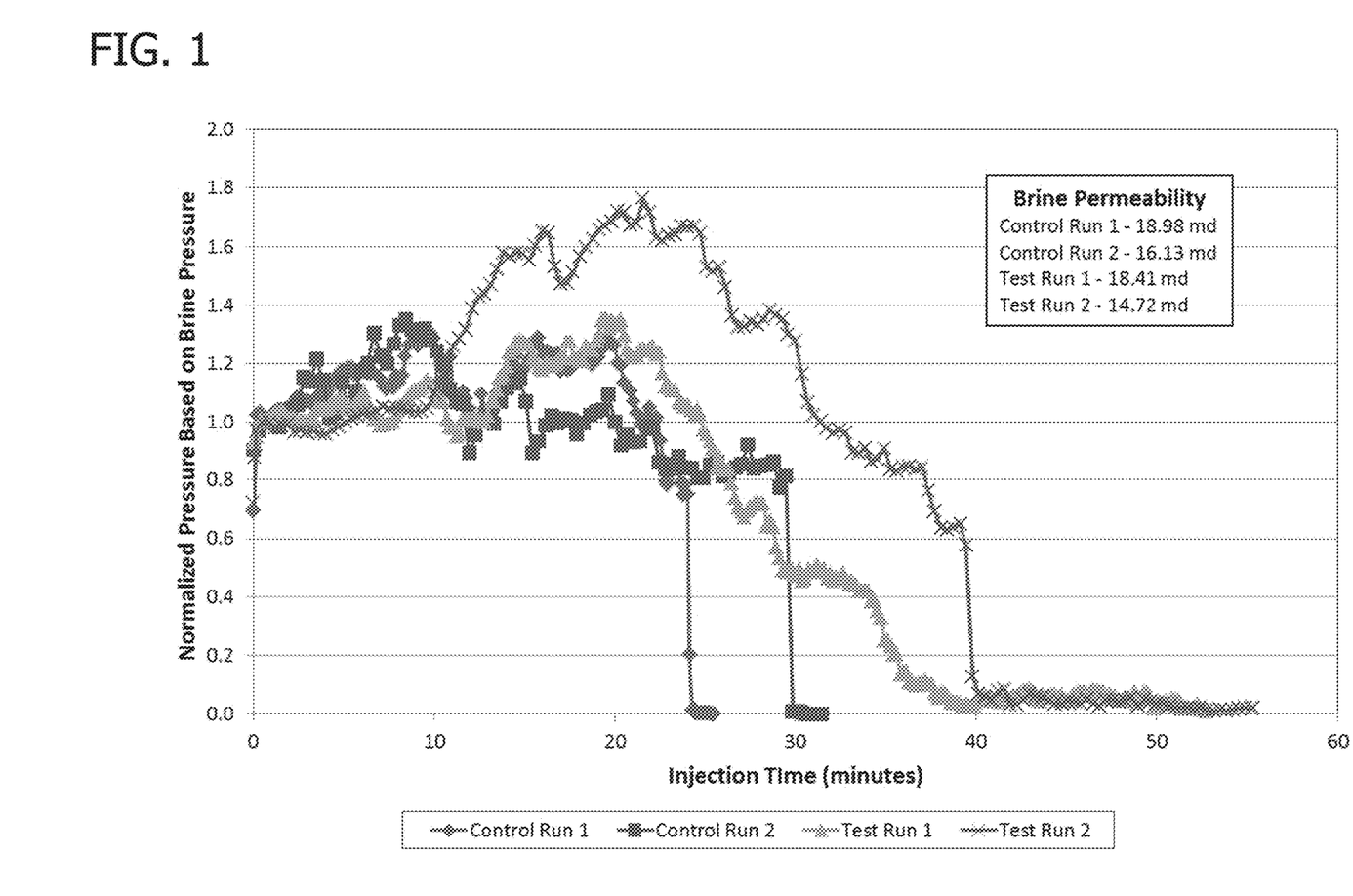
FIG. 1 shows a graph of the normalized pressure vs. injection time for acid diversion fluids injected into cores with and without the VX 11274 polyhydroxyetheramine.
Figure 2:
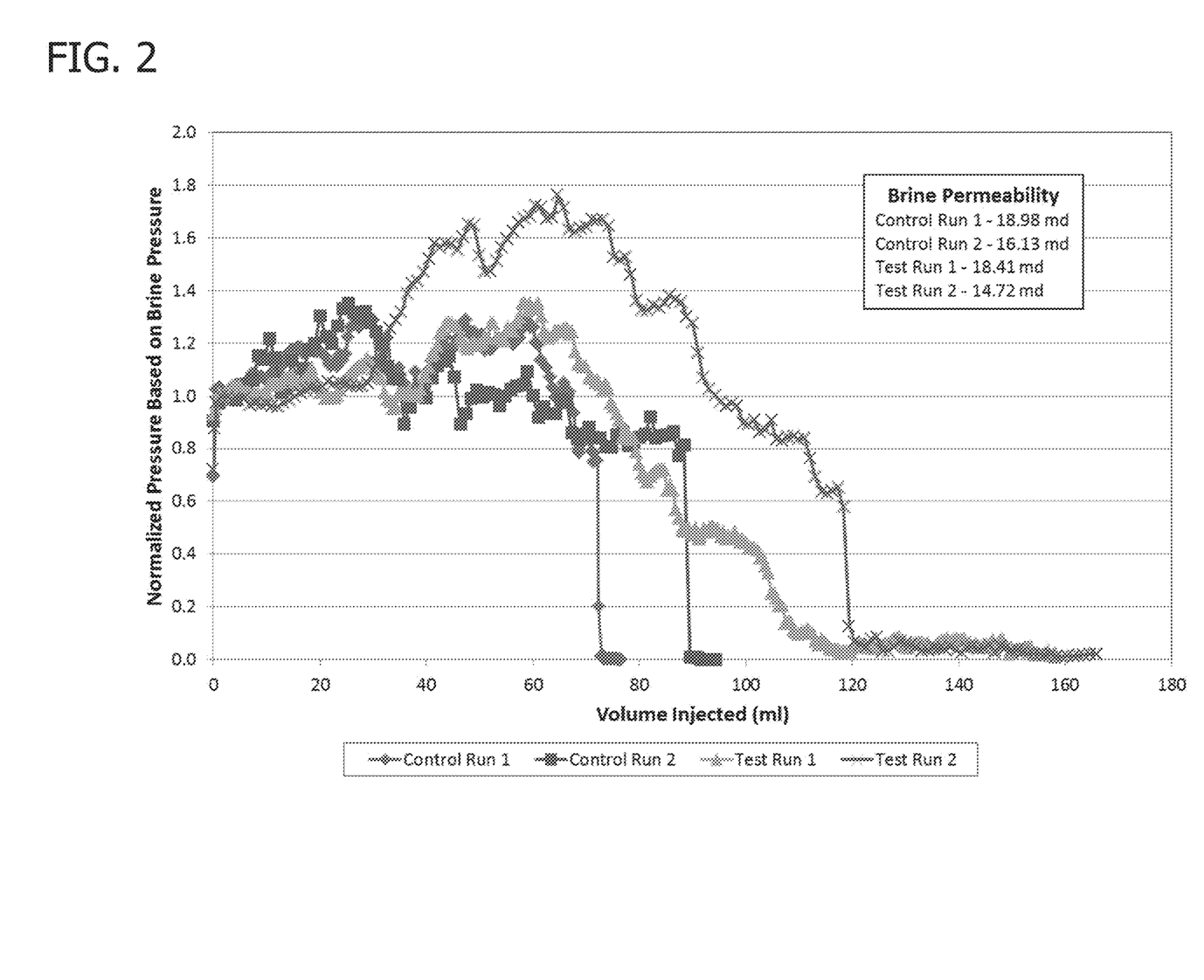
FIG. 2 shows a graph of the normalized pressure vs. injection volume for acid diversion fluids injected into cores with and without the VX 11274 polyhydroxyetheramine.

Differential pressure data was plotted versus time and volume throughput based on the pump time and rate. The test was repeated with a fresh saturated plug sample and the pressure response and volume data for each test was compared on a single graph. The results from these tests are shown in FIG. 1 and summarized in Table 1.

TABLE 1

Summary of Results

| Test | Kw (md) | Volume to Breakthrough (ml) | Time to Breakthrough (min) | Maximum Normalized Pressure | Weight Loss (grams) |
|---|---|---|---|---|---|
| Control Run 1 | 18.98 | 72.8 | 24.12 | 1.302 | 10.15 |
| Control Run 2 | 16.13 | 89.5 | 29.85 | 1.353 | 13.52 |
| Test Run 1 | 18.41 | 115.8 | 38.95 | 1.355 | 26.72 |
| Test Run 2 | 14.72 | 122.5 | 40.52 | 1.762 | 27.74 |

FIG. 1 shows the normalized pressure response versus flow time. The differential pressure is normalized to the API brine flowing pressure prior to switching the flow to the acid solution. This normalization process compensates for the difference in flowing pressure due to variance in permeability between the samples. The data shows that without the acid diversion agent (VX11274), the acid breakthrough time, volume, and weight loss values were less than as shown in Table 1. The breakthrough volumes for the controls were 72.8 and 89.5 mL with more abrupt loss in pressure. The volumes for test runs with the acid diversion agent were larger and for the first test using the acid diversion agent, the breakthrough was not as abrupt. These results were consistent with having a larger area of the core being swept and etched by the acid solution. Thus, the acid diversion agent was effective at increasing the area of the core that contacted the acid solution.

The second test run using an acid diversion agent reached a higher relative pressure of 1.762 which indicated diversion potential.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description and shown in the accompanying drawings shall be interpreted as illustrative and not in a limiting sense.

What is claimed is:

1. A method for increasing recovery of crude oil from a subterranean hydrocarbon-containing formation, the method comprising:
    injecting an injection fluid comprising a water-soluble or dispersible branched polyhydroxyetheramine and an acid into a well, which is in contact with the subterranean hydrocarbon-containing formation, the water-soluble or dispersible branched polyhydroxyetheramine being present at a concentration of from about 500 ppm to about 50,000 ppm and the acid being present at a concentration of from about 5 wt. % to about 28 wt. % acid based on a total amount of the injection fluid injected into the well;
    wherein the total amount of the injection fluid injected into the well comprises the water-soluble or dispersible branched polyhydroxyetheramine, the acid, and water, and
    wherein the water soluble or dispersible polyhydroxyetheramine is a reaction product of (i) a diepoxy or multifunctional epoxy compound, (ii) ethanol amine, (iii) diethanol amine, and (iv) a monofunctionalized polyoxyalkyleneamine; and
    wherein as the acid in the injection fluid reacts with rock in the subterranean hydrocarbon-containing formation, the pH of the injection fluid increases, and colloidal particles of the water-soluble or dispersible branched polyhydroxyetheramine form that divert the injection fluid into untreated parts of the reservoir, thereby increasing the amount of rock that reacts with the acid.

2. The method of claim 1, wherein the injection fluid containing the acid is diverted toward a zone of the subterranean hydrocarbon-containing formation that has a lower permeability to fluid than an adjacent zone.

3. The method of claim 2, wherein the water-soluble or dispersible branched polyhydroxyetheramine concentration is from about 2000 ppm to about 10,000 ppm.

4. The method of claim 1, wherein the acid concentration is from about 10 wt. % to about 28 wt. %.

5. The method of claim 1, wherein the acid comprises a strong acid, a weak acid, or a combination thereof.

6. The method of claim 1, wherein the acid comprises hydrochloric acid, sulfuric acid, hydrobromic acid, hydrofluoric acid, or a combination thereof.

7. The method of claim 1, wherein the subterranean hydrocarbon-containing formation comprises a sandstone reservoir or a carbonate reservoir.

8. The method of claim 7, wherein the injection fluid reacts with from about 40% to about 500% more of the sandstone reservoir or carbonate reservoir as compared to an identical injection fluid, but without the water-soluble or dispersible branched polyhydroxyetheramine, injected into the well.

9. The method of claim 1 wherein the compound is the diepoxy compound and the diepoxy compound is a diglycidyl ether of resorcinol, a diglycidyl ether of catechol, a diglycidyl ether of hydroquinone, a diglycidyl ether of bisphenol A, a diglycidyl ether of bisphenol F, a diglycidyl ether of bisphenol E, a diglycidyl ether of bisphenol K, a diglycidyl ether of 1,4'-dihydroxynapthalene, a diglycidyl ether of 2,2-bis(4-hydroxyphenyl)ethanol, a diglycidyl ether of 2,2-bistris-hydroxyphenyl methane, a diglycidyl ether of 2,6,2',6'-tetrabromo-p,p'-bisphenol A, a diglycidyl ether of 4,4'-dihydroxydiphenylethylmethane, a diglycidyl ether of 3,3'-dihydroxydiphenyldiethylmethane, or a combination thereof.

10. The method of claim 1, wherein the compound is the diepoxy compound and the diepoxy compound is a diglycidyl ether of bisphenol A.

11. The method of claim 1, wherein the acid concentration is from about 10 wt. % to about 20 wt. %.

12. A method for increasing recovery of crude oil from a subterranean hydrocarbon-containing formation, the method comprising:
  injecting a composition comprising a water-soluble or dispersible branched polyhydroxyetheramine, an acid, and water into a well which is in contact with the subterranean hydrocarbon-containing formation; the composition comprising the water-soluble or dispersible branched polyhydroxyetheramine at a concentration of from about 500 ppm to about 50,000 ppm and the acid at a concentration of from about 5 wt. % to about 28 wt. % acid based on the total amount of the composition injected into the well;
  wherein the water-soluble or dispersible branched polyhydroxyetheramine is selected from the group consisting of a diethanolamine capped ethanolamine/diglycidyl ether of neopentyl glycol copolymer grafted with epichlorohydrin terminated polyethyleneglycol methyl ether, an N,N,N'-trimethyl-1,3-propanediamine capped ethanolamine/3-(dimethylamino)propylamine/diglycidyl ether of neopentyl glycol terpolymer grafted with epichlorohydrin terminated polyethyleneglycol methyl ether polymer, a diethanolamine capped 3-(dimethylamino)propylamine/ethanolamine/poly(ethylene glycol) diglycidyl ether terpolymer grafted with epichlorohydrin terminated polyethyleneglycol methyl ether, and a diethanolamine capped 3-(dimethylamino)propylamine/ethanolamine/ethylene glycol diglycidyl ether terpolymer grafted with epichlorohydrin terminated polyethyleneglycol methyl ether; and
  wherein as the acid in the composition reacts with rock in the subterranean hydrocarbon-containing formation, the pH of the composition increases, and colloidal particles of the water-soluble or dispersible branched polyhydroxyetheramine form that divert the acid into untreated parts of the reservoir, thereby increasing the amount of rock that reacts with the acid in the composition.

13. The method of claim 12, further comprising the steps of (i) diluting the composition in a brine solution to form a brine mixture and (ii) pumping the brine mixture into the well at a matrix rate.

14. The method of claim 13, wherein the brine mixture comprises from about 2 wt. % to about 7 wt. % potassium chloride (KCl).

15. The method of claim 14, wherein the brine mixture comprises about 6 wt. % sodium chloride (NaCl).

16. The method of claim 13, further comprising the steps of (i) mixing the composition with a hydraulic fracturing fluid to form a fracturing mixture and (ii) introducing the mixture into the well during fracture stimulation.

17. The method of claim 16, wherein the fracturing mixture further comprises a viscosifying agent, a solvent, an alkali, a flow back aid, a non-emulsifier, a friction reducer, a breaker, a crosslinking agent, a biocide, a proppant, or a combination thereof.

* * * * *